United States Patent
Kang et al.

(10) Patent No.: US 10,009,161 B2
(45) Date of Patent: Jun. 26, 2018

(54) METHOD FOR TRANSMITTING AND RECEIVING THE CHANNEL STATE INFORMATION AND APPARATUS THEREOF

(71) Applicant: KT CORPORATION, Gyeonggi-do (KR)

(72) Inventors: Seung Hyun Kang, Seoul (KR); Woo-jin Choi, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days. days.

(21) Appl. No.: 15/454,020

(22) Filed: Mar. 9, 2017

(65) Prior Publication Data

US 2017/0180102 A1   Jun. 22, 2017

Related U.S. Application Data

(63) Continuation of application No. 14/664,853, filed on Mar. 21, 2015, now Pat. No. 9,629,010.

(30) Foreign Application Priority Data

Mar. 21, 2014  (KR) .................. 10-2014-0033579
Mar. 25, 2014  (KR) .................. 10-2014-0034955

(Continued)

(51) Int. Cl.
*H04W 24/02*  (2009.01)
*H04W 24/08*  (2009.01)
(Continued)

(52) U.S. Cl.
CPC .......... *H04L 5/0057* (2013.01); *H04L 1/0003* (2013.01); *H04L 5/0048* (2013.01); *H04L 27/34* (2013.01); *H04W 24/08* (2013.01)

(58) Field of Classification Search
CPC .. H04B 7/0632; H04B 7/0417; H04B 7/0626; H04B 7/0639; H04L 1/0023;
(Continued)

(56) References Cited

U.S. PATENT DOCUMENTS 9,001,845 B2 * 4/2015 Enescu ................. H04W 24/10
                                                              370/464
9,629,010 B2 * 4/2017 Kang .................... H04W 24/08
(Continued)

FOREIGN PATENT DOCUMENTS

WO     2013/123961 A1    8/2013

OTHER PUBLICATIONS

Broadcom Corporation, "Details of CQI table and feedback design for high order modulation", R1-140609, 3GPP TSG-RAN WG1 Meeting #76, Prague, Czech Republic, Feb. 10-14, 2014, pp. 1-6.
(Continued)

*Primary Examiner* — Ahmed Elallam
(74) *Attorney, Agent, or Firm* — IP Legal Services, LLC

(57) ABSTRACT

The present disclosure relates to an apparatus and a method for transmitting and receiving channel state information of a User Equipment that supports 256-state quadrature amplitude modulation (256QAM). The method may include: receiving a reference signal for measuring channel quality from a base station; measuring the channel quality based on the reference signal, and selecting a CQI index value from a predetermined CQI index table including CQI index values for 256QAM modulation, based on the measurement result of the channel quality; and transmitting channel state information including the selected CQI index value to the base station.

6 Claims, 25 Drawing Sheets

(30) Foreign Application Priority Data

Mar. 31, 2014 (KR) .......................... 10-2014-0037394
Dec. 8, 2014 (KR) .......................... 10-2014-0175190

(51) Int. Cl.
    *H04L 5/00* (2006.01)
    *H04L 27/34* (2006.01)
    *H04L 1/00* (2006.01)

(58) Field of Classification Search
    CPC . H04L 1/0026; H04L 25/0202; H04L 5/0035; H04L 5/0057; H04W 24/02; H04W 24/08; H04W 24/10
    See application file for complete search history.

(56) References Cited

U.S. PATENT DOCUMENTS

| | | | |
|---|---|---|---|
| 9,860,091 B2* | 1/2018 | Larsson | H04L 27/0008 |
| 2014/0192732 A1* | 7/2014 | Chen | H04L 1/0003 370/329 |
| 2014/0241201 A1 | 8/2014 | Kim et al. | |
| 2015/0036590 A1 | 2/2015 | Lahetkangas et al. | |
| 2015/0163773 A1 | 6/2015 | Wang et al. | |
| 2015/0271794 A1 | 9/2015 | Kang et al. | |
| 2015/0358111 A1 | 12/2015 | Marinier et al. | |
| 2015/0372784 A1 | 12/2015 | Xu et al. | |
| 2015/0381310 A1* | 12/2015 | Hammarwall | H04L 1/0003 370/329 |
| 2016/0081071 A1 | 3/2016 | Song et al. | |
| 2016/0211904 A1 | 7/2016 | Kim et al. | |
| 2016/0218789 A1 | 7/2016 | Park et al. | |
| 2016/0218790 A1 | 7/2016 | Hwang et al. | |
| 2016/0219600 A1 | 7/2016 | Li et al. | |
| 2016/0226623 A1 | 8/2016 | Froberg Olsson et al. | |
| 2016/0249244 A1 | 8/2016 | Xia et al. | |
| 2016/0254894 A1 | 9/2016 | Tomeba et al. | |
| 2016/0323912 A1 | 11/2016 | Nakamura et al. | |
| 2016/0337023 A1* | 11/2016 | Yi | H04L 5/0046 |
| 2017/0208570 A1* | 7/2017 | Wang | H04W 72/042 |

OTHER PUBLICATIONS

Alcatel-Lucent Shanghai Bell, Alcatel-Lucent, "Specification of 256 QAM", R1-140160, 3GPP TSG RAN WG1 Meeting #76, Prague, Czech Republic, Feb. 10-14, 2014, pp. 1-7.

ZTE, "Evaluation and standard impact on EVM and receiver impairment for small cell 256QAM", R1-135348, 3GPP TSG RAN WG1 Meeting #75, San Francisco, USA, Nov. 11-15, 2013, pp. 1-7.

Alcatel-Lucent Shanghai Bell, Alcatel-Lucent, "Consideration of implementation issues for 256 QAM" R1-132058, 3GPP TSG RAN WG1 Meeting #73, Fukuoka, Japan, May 20-24, 2013, pp. 1-7.

3GPP TS 36.213 V12.0.0, "3rd Generation Partnership Project; Technical Specification Group Radio Access Network; Evolved Universal Terrestrial Radio Access (E-UTRA); Physical layer procedures (Release 12)", Dec. 20, 2013, pp. 1-192.

Huawei et al., "Standard impacts of 256QAM", R1-135033, 3GPP TSG RAN WG1 Meeting #75, San Francisco, USA, Nov. 11-15, 2013, pp. 1-7.

Huawei et al., "CQI/MCS table design for 256QAM", R1-140034, 3GPP TSG RAN WG1 Meeting #76, Prague, Czech Republic, Feb. 10-14, 2014, pp. 1-9.

Ericsson, "CQI table design for downlink 256QAM", R1-140753, 33GPP TSG RAN WG1 Meeting #76, Prague, Czech Republic, Feb. 10-14, 2014, pp. 1-5.

* cited by examiner

FIG.1

| MCS INDEX $I_{MCS}$ | MODULATION ORDER $Q_M$ | TBS INDEX $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | RESERVED |
| 30 | 4 | |
| 31 | 6 | |

FIG.3

| CQI INDEX | MODULATION | CODE RATE X 1024 | EFFICIENCY |
|---|---|---|---|
| 0 | | OUT OF RANGE | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

FIG.4

| CQI INDEX | $I_{MCS}$ | $I_{TBS}$ | CODE RATE * 1024 | EFFICIENCY |
|---|---|---|---|---|
| 2 | 0 | 0 | 120 | 0.2344 |
| - | 1 | 1 | 157 | 0.3057 |
| 3 | 2 | 2 | 193 | 0.3770 |
| - | 3 | 3 | 251 | 0.4893 |
| 4 | 4 | 4 | 308 | 0.6016 |
| - | 5 | 5 | 379 | 0.7393 |
| 5 | 6 | 6 | 449 | 0.8770 |
| - | 7 | 7 | 526 | 1.0264 |
| 6 | 8 | 8 | 602 | 1.1758 |
| - | 9 | 9 | 679 | 1.3262 |
| - | 10 | 9 | 340 | 1.3262 |
| 7 | 11 | 10 | 378 | 1.4766 |
| - | 12 | 11 | 434 | 1.6954 |
| 8 | 13 | 12 | 490 | 1.9141 |
| - | 14 | 13 | 553 | 2.1602 |
| 9 | 15 | 14 | 616 | 2.4063 |
| - | 16 | 15 | 658 | 2.5684 |
| - | 17 | 15 | 438 | 2.5684 |
| 10 | 18 | 16 | 466 | 2.7305 |
| - | 19 | 17 | 517 | 3.0264 |
| 11 | 20 | 18 | 567 | 3.3223 |
| - | 21 | 19 | 616 | 3.6123 |
| 12 | 22 | 20 | 666 | 3.9023 |
| - | 23 | 21 | 719 | 4.2129 |
| 13 | 24 | 22 | 772 | 4.5234 |
| - | 25 | 23 | 822 | 4.8193 |
| 14 | 26 | 24 | 873 | 5.1152 |
| - | 27 | 25 | 910 | 5.3350 |
| 15 | 28 | 26 | 948 | 5.5547 |

FIG.7

| CQI INDEX | $I_{MCS}$ | $I_{TBS}$ | CODE RATE *1024 | EFFICIENCY | Esti. Req. SNR | Eff. code rate*1024 | Eff. EFFICIENCY | Eval. Req. SNR | Esti. Req. SNR -Eval. Req. SNR |
|---|---|---|---|---|---|---|---|---|---|
| 10 | 18 | 16 | 466 | 2.730 | 7.210 | 466.004 | 2.73049 | 7.199 | 0.010 |
|  | 19 | 17 | 517 | 3.029 | 8.163 | 516.845 | 3.02839 | 8.131 | 0.032 |
| 11 | 20 | 18 | 567 | 3.322 | 9.098 | 566.960 | 3.32203 | 9.071 | 0.027 |
|  | 21 | 19 | 616 | 3.609 | 10.015 | 616.783 | 3.61396 | 10.024 | -0.009 |
| 12 | 22 | 20 | 666 | 3.902 | 10.950 | 665.742 | 3.90083 | 10.990 | -0.041 |
|  | 23 | 21 | 719 | 4.213 | 11.941 | 719.048 | 4.21317 | 11.972 | -0.031 |
| 13 | 24 | 22 | 772 | 4.523 | 12.932 | 771.961 | 4.52321 | 12.820 | 0.112 |
|  | 25 | 23 | 822 | 4.816 | 13.867 | 821.769 | 4.81505 | 13.783 | 0.084 |
| 14 | 26 | 24 | 873 | 5.115 | 14.820 | 872.917 | 5.11475 | 14.772 | 0.048 |
|  | 27 | 25 | 910 | 5.332 | 15.618 | 911.160 | 5.33883 | 15.637 | -0.018 |
| 15 | 28 | 26 | 948 | 5.555 | 16.606 | 948.043 | 5.55494 | 16.607 | -0.001 |

FIG.8

| CODE RATE *1024 | EFFICIENCY | Esti. Req. SNR | Eff. CODE RATE*1024 | Eff. EFFICIENCY | Eval. Req. SNR | Esti. Req. SNR - Eval. Req. SNR |
|---|---|---|---|---|---|---|
| 654 | 5.109 | 15.490 | 653.907 | 5.109 | 15.511 | -0.021 |
| 683 | 5.336 | 16.108 | 682.666 | 5.333 | 16.023 | 0.085 |
| 708 | 5.531 | 16.640 | 707.764 | 5.529 | 16.587 | 0.053 |
| 711 | 5.555 | 16.704 | 711.032 | 5.555 | 16.646 | 0.058 |
| 724 | 5.656 | 16.981 | 723.730 | 5.654 | 16.979 | 0.002 |
| 740 | 5.781 | 17.322 | 739.720 | 5.779 | 17.313 | 0.009 |
| 756 | 5.906 | 17.663 | 755.690 | 5.904 | 17.639 | 0.024 |
| 773 | 6.039 | 18.025 | 773.140 | 6.040 | 18.007 | 0.017 |
| 789 | 6.164 | 18.366 | 788.983 | 6.164 | 18.328 | 0.037 |
| 805 | 6.289 | 18.706 | 804.648 | 6.286 | 18.693 | 0.013 |
| 821 | 6.414 | 19.047 | 820.947 | 6.414 | 19.030 | 0.017 |
| 838 | 6.547 | 19.409 | 837.920 | 6.546 | 19.390 | 0.019 |
| 854 | 6.672 | 19.750 | 853.711 | 6.670 | 19.686 | 0.064 |
| 870 | 6.797 | 20.091 | 870.111 | 6.798 | 20.059 | 0.032 |
| 886 | 6.922 | 20.483 | 886.131 | 6.923 | 20.526 | -0.043 |
| 903 | 7.055 | 20.940 | 902.752 | 7.053 | 20.933 | 0.007 |
| 919 | 7.180 | 21.386 | 918.912 | 7.179 | 21.388 | -0.002 |
| 935 | 7.305 | 21.850 | 934.524 | 7.301 | 21.862 | -0.013 |
| 952 | 7.438 | 22.360 | 951.852 | 7.436 | 22.362 | -0.002 |

FIG.10

| CQI INDEX | TARGET SNR |
|---|---|
| 10 | 7.2095 |
| 11 | 10.2152 |
| 12 | 13.2210 |
| 13 | 16.2267 |
| 14 | 19.2324 |
| 15 | 22.2382 |

FIG.11

| CQI INDEX | MODULATION | R | EFFICIENCY | TARGET SNR | Esti. Req. SNR | SNR GAP |
|---|---|---|---|---|---|---|
| 10 | 64QAM | 466 | 2.7305 | 7.2095 | 7.2095 | - |
| 11 | 64QAM | 627 | 3.6738 | 10.2152 | 10.2202 | 3.0107 |
| 12 | 64QAM | 787 | 4.6113 | 13.221 | 13.2122 | 2.9920 |
| 13 | 64QAM | 934 | 5.4727 | 16.2267 | 16.2279 | 3.0157 |
| 14 | 256QAM | 830 | 6.4844 | 19.2324 | 19.2389 | 3.0110 |
| 15 | 256QAM | 948 | 7.4063 | 22.2382 | 22.2382 | 2.9993 |

FIG.12

| CQI INDEX | MODULATION | R | EFFICIENCY | TARGET SNR | Esti. Req. SNR | SNR GAP |
|---|---|---|---|---|---|---|
| 10 | 64QAM | 466 | 2.7305 | 7.2095 | 7.2095 | - |
| 11 | 64QAM | 628 | 3.6797 | 10.2396 | 10.2389 | 3.0294 |
| 12 | 64QAM | 790 | 4.6289 | 13.2697 | 13.2683 | 3.0294 |
| 13 | 64QAM | 937 | 5.4902 | 16.2997 | 16.3075 | 3.0392 |
| 14 | 256QAM | 834 | 6.5156 | 19.3298 | 19.3241 | 3.0166 |
| 15 | 256QAM | 952 | 7.4375 | 22.3599 | 22.3599 | 3.0358 |

FIG.13

| CQI INDEX | TYPICAL CQI INDEX | TYPICAL I$_{MCS}$ | R | TYPICAL I$_{TBS}$ | Esti. Req. SNR | GAP BETWEEN ADJACENT CQI AND SNR |
|---|---|---|---|---|---|---|
| 10 | 10 | 18 | 466 | 16 | 7.2095 | - |
| 11 | - | 20 | 616 | 19 | 10.0145 | 2.8050 |
| 12 | 13 | 22 | 772 | 22 | 12.9317 | 2.9172 |
| 13 | - | 24 | 910 | 25 | 15.6185 | 2.6868 |

FIG.14

| CQI INDEX | MODULATION | R | EFFICIENCY | Esti. Req. SNR | SNR GAP |
|---|---|---|---|---|---|
| 10 | 64QAM | 466 | 2.7305 | 7.2095 | - |
| 11 | 64QAM | 616 | 3.6094 | 10.0145 | 2.805 |
| 12 | 64QAM | 772 | 4.5234 | 12.9317 | 2.917 |
| 13 | 64QAM | 910 | 5.3320 | 15.6185 | 2.687 |
| 14 | 256QAM | 815 | 6.3672 | 18.9194 | 3.301 |
| 15 | 256QAM | 948 | 7.4063 | 22.2382 | 3.319 |

FIG.15

| CQI INDEX | MODULATION | R | EFFICIENCY | Esti. Req. SNR | SNR GAP |
|---|---|---|---|---|---|
| 10 | 64QAM | 466 | 2.7305 | 7.2095 | - |
| 11 | 64QAM | 616 | 3.6094 | 10.0145 | 2.8050 |
| 12 | 64QAM | 772 | 4.5234 | 12.9317 | 2.9172 |
| 13 | 64QAM | 910 | 5.3320 | 15.6185 | 2.6868 |
| 14 | 256QAM | 818 | 6.3906 | 18.9833 | 3.3648 |
| 15 | 256QAM | 952 | 7.4375 | 22.3599 | 3.3766 |

FIG.16

| CQI INDEX | CODE RATE * 1024 | MODULATION ORDER | EFFICIENCY | TYPICAL CQI INDEX | SNR GAP |
|---|---|---|---|---|---|
| 1 | 78 | QPSK | 0.1523 | 1 | - |
| 2 | 193 | QPSK | 0.3770 | 3 | 3.6869 |
| 3 | 449 | QPSK | 0.8770 | 5 | 3.8828 |
| 4 | 378 | 16QAM | 1.4766 | 7 | 3.8266 |
| 5 | 490 | 16QAM | 1.9141 | 8 | 1.8077 |
| 6 | 616 | 16QAM | 2.4063 | 9 | 1.9562 |
| 7 | 466 | 64QAM | 2.7305 | 10 | 1.8968 |
| 8 | 567 | 64QAM | 3.3223 | 11 | 1.8715 |
| 9 | 666 | 64QAM | 3.9023 | 12 | 1.9191 |
| 10 | 772 | 64QAM | 4.5234 | 13 | 1.8296 |
| 11 | 873 | 64QAM | 5.1152 | 14 | 1.9525 |
| 12 | $R_{12}$ | 256QAM | - | - | - |
| 13 | $R_{13}$ | 256QAM | - | - | - |
| 14 | $R_{14}$ | 256QAM | - | - | - |
| 15 | $R_{15}$ | 256QAM | - | - | - |

FIG.17

| R=CODE RATE*1024 | MODULATION | TARGET SNR |
|---|---|---|
| $R_{22}$ | 256QAM | 16.6748 |
| $R_{24}$ | 256QAM | 18.5293 |
| $R_{26}$ | 256QAM | 20.3837 |
| 948 | 256QAM | 22.2382 |

FIG.18

| CQI INDEX | R | MODULATION | TARGET Req. SNR | Est. Req. SNR |
|---|---|---|---|---|
| 12 | 710 | 256QAM | 16.6748 | 16.6829 |
| 13 | 797 | 256QAM | 18.5293 | 18.5360 |
| 14 | 882 | 256QAM | 20.3837 | 20.3779 |
| 15 | 948 | 256QAM | 22.2382 | 22.2382 |

*FIG.19*

| R=CODE RATE*1024 | MODULATION | TARGET SNR |
|---|---|---|
| $R_{22}$ | 256QAM | 16.7053 |
| $R_{24}$ | 256QAM | 18.5901 |
| $R_{26}$ | 256QAM | 20.4750 |
| 952 | 256QAM | 22.3599 |

FIG.20

| CQI INDEX | R | MODULATION | TARGET Req. SNR | Est. Req. SNR |
|---|---|---|---|---|
| 12 | 711 | 256QAM | 16.7053 | 16.7042 |
| 13 | 800 | 256QAM | 18.5901 | 18.5999 |
| 14 | 886 | 256QAM | 20.4750 | 20.4827 |
| 15 | 952 | 256QAM | 22.3599 | 22.3599 |

FIG.21

| CQI INDEX | R | MODULATION | TARGET Req. SNR | Est. Req. SNR |
|---|---|---|---|---|
| 12 | 711 | 256QAM | 16.7053 | 16.7042 |
| 13 | 797 | 256QAM | 18.5293 | 18.5360 |
| 14 | 882 | 256QAM | 20.3837 | 20.3779 |
| 15 | 948 | 256QAM | 22.2382 | 22.2382 |

METHOD FOR TRANSMITTING AND RECEIVING THE CHANNEL STATE INFORMATION AND APPARATUS THEREOF

CROSS-REFERENCE TO RELATED APPLICATION

The present application is continuation application of U.S. patent application Ser. No. 14/664,853 (filed on Mar. 21, 2015), which claims priority under 35 U.S.C. § 119 to Korean Patent Application Nos. 10-2014-0033579 (filed on Mar. 21, 2014), 10-2014-0034955 (filed on Mar. 25, 2014), 10-2014-0037394 (filed on Mar. 31, 2014), and 10-2014-0175190 (filed on Dec. 8, 2014).

BACKGROUND OF THE INVENTION

1. Field of the Invention

The present disclosure relates to an apparatus and a method for transmitting and receiving channel state information of a terminal that supports 256-state quadrature amplitude modulation (256QAM), and more particularly, to an apparatus and a method for transmitting and receiving channel state information that includes channel quality indicators (CQI) in order to support 256QAM in addition to three typical modulation methods, i.e., quadrature phase shift keying (QPSK), 16-state quadrature amplitude modulation (16QAM), and 64-state quadrature amplitude modulation (64QAM).

2. Description of the Prior Art

Information may be transmitted through a signal using signal properties such as intensities, frequencies, and phases thereof. Modulation is a process of transforming such signal properties into proper waveforms according to channel characteristics of a transmission medium. A digital signal may be used to transmit digital information by mapping the digital information to one of bit stream and a digitalized analog signal (sampled or analog-to-digital converted signal). Digital modulation is a process of transforming such digital signals (i.e., digital symbol sequences) to a proper signal according to the channel characteristics of a transmission medium. One of the typical modulation methods having high bandwidth efficiency is an M-ary QAM method that is expressed as $2^M$ QAM, for example, QPSK (or 4QAM), 16QAM, or 64QAM.

The modulation methods of QPSK, 16QAM, and 64QAM are used for downlink data transmission in wireless communication systems such as Long Term Evolution (LTE) or LTE-Advanced. A base station transmits data to a terminal using such modulation methods, and the terminal receives data by demodulating transmitted signals.

Recently, an amount of data transmitted and received between terminals and associated base stations has been increased abruptly due to sharp increase in the number of user terminals and in the data usage. This requires a modulation method that can rapidly process a large amount of data traffic.

Meanwhile, a base station selects one of the modulation methods by considering a downlink channel state, and informs an associated terminal of the same using downlink control information (DCI). The terminal identifies the received downlink control information, and performs demodulation of data corresponding to the modulation method to thereby receive the data.

To this end, the terminal measures the downlink channel state, and transmits information on the measured channel state to the base station. At this time, the terminal transmits CQI information included in the channel state information signal, which is mapped with QPSK, 16QAM, and 64QAM, to the base station. However, due to sharp increase in data traffic and data speed a new modulation method has been demanded. Furthermore, it has been also demanded for a method for indicating such a new modulation method in the CQI information having a limited size.

SUMMARY OF THE INVENTION

In order to address the demands mentioned above, the present disclosure provides an apparatus and a method for newly configuring a CQI index table in the case of adopting 256QAM as a newly defined modulation method.

In addition, the present disclosure provides an apparatus and a method for transmitting a channel state information signal including a newly defined CQI index table.

In accordance with an aspect of the present disclosure, a method may be provided for transmitting channel state information by a User Equipment (UE). The method may include: receiving a reference signal for measuring channel quality from a base station; measuring the channel quality based on the reference signal, and selecting a CQI index value from a predetermined CQI index table including CQI index values for 256QAM modulation, based on the measurement result of the channel quality; and transmitting channel state information including the selected CQI index value to the base station.

In accordance with another aspect of the present disclosure, a method may be provided for receiving channel state information by a base station. The method may include: creating a reference signal for measuring channel quality; transmitting the reference signal to a User Equipment; and receiving channel state information including a CQI index selected from a predetermined CQI index table including CQI index values for 256QAM modulation, based on a measurement result of the channel quality, from the User Equipment.

In accordance with another aspect of the present disclosure, a User Equipment may be provided for transmitting channel state information. The user equipment may include: a receiver, a controller, and a transmitter. The receiver may be configured to receive a reference signal for measuring channel quality from a base station. The controller may be configured to measure the channel quality based on the reference signal and to select a CQI index value from a predetermined CQI index table including CQI index values for 256QAM modulation, based on the measurement result of the channel quality. The transmitter may be configured to transmit channel state information including the selected CQI index value to the base station.

In accordance with another aspect of the present disclosure, a base station may be provided for transmitting channel state information. The base station may include: a controller, a transmitter, and a receiver. The controller may be configured to create a reference signal for measuring channel quality. The transmitter may be configured to transmit the reference signal to a User Equipment. The receiver may be configured to receive channel state information including a CQI index selected from a predetermined CQI index table including CQI index values for 256QAM modulation, based on a measurement result of the channel quality, from the User Equipment.

In accordance with at least one embodiment of the present disclosure, an apparatus and a method for newly configuring a CQI index table in the case of adopting 256QAM may be provided as a newly defined modulation method.

In addition, an apparatus and a method may be provided for transmitting a channel state information signal including a newly defined CQI index table In accordance with at least one embodiment of the present disclosure.

BRIEF DESCRIPTION OF THE DRAWINGS

The above and other objects, features and advantages of the present disclosure will be more apparent from the following detailed description taken in conjunction with the accompanying drawings, in which:

FIG. 1 is a table showing the relationship among modulation orders, MCS indexes, and TBS indexes;

FIG. 3 illustrates a typical CQI index table;

FIG. 4 is a mapping table of a typical CQI index table, MCS indexes, and TBS indexes;

FIG. 7 is a table showing an example of the transmission efficiency of 64QAM and required SNR values in FIG. 6;

FIG. 8 is a table showing an example of the transmission efficiency of 256QAM and required SNR values in FIG. 6;

FIG. 10 is a table showing target SNRs of CQI index values according to the first embodiment of the present disclosure;

FIG. 11 illustrates an example of a CQI index table according to the first embodiment of the present disclosure;

FIG. 12 illustrates another example of a CQI index table according to the first embodiment of the present disclosure;

FIG. 13 illustrates an example of MCS indexes reused for new CQI indexes of 64QAM according to the second embodiment of the present disclosure;

FIG. 14 illustrates an example of a CQI index table according to the second embodiment of the present disclosure;

FIG. 15 illustrates another example of a CQI index table according to the second embodiment of the present disclosure;

FIG. 16 illustrates an example of a CQI index table up to 64QAM according to the third embodiment of the present disclosure;

FIG. 17 illustrates an example of target SNRs in the 256QAM modulation method according to the third embodiment of the present disclosure;

FIG. 18 illustrates an example of a CQI index table in the 256QAM modulation method according to the third embodiment of the present disclosure;

FIG. 19 illustrates another example of target SNRs in the 256QAM modulation method according to the third embodiment of the present disclosure;

FIG. 20 illustrates another example of a CQI index table in the 256QAM modulation method according to the third embodiment of the present disclosure;

FIG. 21 illustrates still another example of a CQI index table in the 256QAM modulation method according to the third embodiment of the present disclosure;

DETAILED DESCRIPTION OF THE EXEMPLARY EMBODIMENTS

Figure 2:
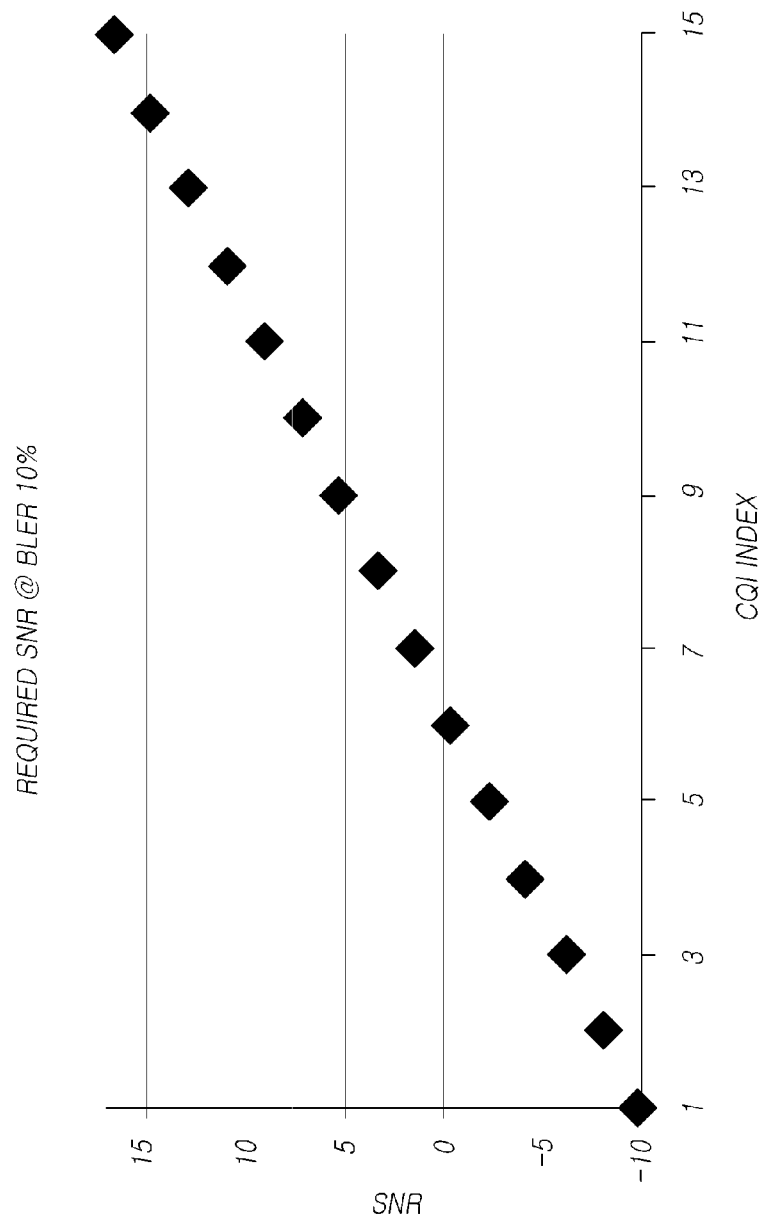
FIG. 2 is a diagram illustrating CQI block error rate (BLER) performance.

Hereinafter, various embodiments of the present disclosure will be described in detail with reference to the accompanying drawings. In the following description, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

In the present specifications, a MTC UE refers to a UE that is low cost (or is not very complexity), a UE that supports coverage enhancement, or the like. In the present specifications, the MTC UE refers to a UE that supports low cost (or low complexity) and coverage enhancement. Alternatively, in the present specifications, the MTC UE refers to a UE defined as a predetermined category for maintaining low costs (or low complexity) and/or coverage enhancement.

In other words, in the present specifications, the MTC UE may refer to a newly defined 3GPP Release 13 low cost (or low complexity) UE category/type, which executes LTE-based MTC related operations. Alternatively, in the present specifications, the MTC UE may refer to a UE category/type that is defined in or before 3GPP Release 12 that supports the enhanced coverage in comparison with the existing LTE coverage, or supports low power consumption, or may refer to a newly defined Release 13 low cost (or low complexity) UE category/type.

The wireless communication system may be widely installed so as to provide various communication services, such as a voice service, a packet data service, and the like. The wireless communication system may include a User Equipment (UE) and a Base Station (BS or an eNB). Throughout the specifications, the user equipment may be an inclusive concept indicating a user terminal utilized in wireless communication, including a UE (User Equipment) in wideband code division multiple access (WCDMA), long term evolution (LTE), high speed packet access (HSPA), and the like, and an mobile station (MS), a user terminal (UT), an subscriber station (SS), a wireless device, and the like in global system for mobile communications (GSM).

A base station or a cell may generally refer to a station where communication with a User Equipment (UE) is performed, and may also be referred to as a Node-B, an evolved Node-B (eNB), a Sector, a Site, a Base Transceiver System (BTS), an Access Point, a Relay Node, a Remote Radio Head (RRH), a Radio Unit (RU), and the like.

That is, the base station 20 or the cell may be construed as an inclusive concept indicating a portion of an area covered by a Base Station Controller (BSC) in CDMA, a NodeB in WCDMA, an eNB or a sector (e.g., site) in LTE, and the like, and the concept may include various coverage areas, such as a megacell, a macrocell, a microcell, a picocell, a femtocell, a communication range of a relay node, and the like.

Each of the above mentioned various cells has a base station that controls a corresponding cell. Thus, the base station may be construed in two ways: i) the base station may be a device itself that provides a megacell, a macrocell, a microcell, a picocell, a femtocell, and a small cell in association with a wireless area; or ii) the base station may indicate a wireless area itself. In i), all devices that interact with one another so as to enable the devices that provide a predetermined wireless area to be controlled by an identical entity or to cooperatively configure the wireless area, may be indicated as a base station. Based on a configuration type of a wireless area, an eNB, an RRH, an antenna, an RU, a Low Power Node (LPN), a point, a transmission/reception point, a transmission point, a reception point, and the like may be embodiments of a base station. In ii), a wireless area itself that receives or transmits a signal from a perspective of a UE or a neighboring base station, may be indicated as a base station.

Therefore, a megacell, a macrocell, a microcell, a picocell, a femtocell, a small cell, an RRH, an antenna, an RU, an LPN, a point, an eNB, a transmission/reception point, a transmission point, and a reception point are commonly referred to as a base station.

In the specifications, the user equipment and the base station are used as two inclusive transceiving subjects to embody the technology and technical concepts described in the specifications, and may not be limited to a predetermined term or word. The user equipment and the base station are used as two inclusive transceiving subjects (Uplink and Downlink) to embody the technology and technical concepts described in the specifications, and may not be limited to a predetermined term or word. Here, Uplink (UL) refers to a scheme for a UE to transmit and receive data to/from a base station, and Downlink (DL) refers to a scheme for a base station to transmit and receive data to/from a UE.

Multiple access schemes may be unrestrictedly applied to the wireless communication system. The wireless communication system may utilize varied multiple access schemes, such as Code Division Multiple Access (CDMA), Time Division Multiple Access (TDMA), Frequency Division Multiple Access (FDMA), Orthogonal Frequency Division Multiple Access (OFDMA), OFDM-FDMA, OFDM-TDMA, OFDM-CDMA, and the like. An embodiment of the present disclosure may be applicable to resource allocation in an asynchronous wireless communication scheme that is advanced through GSM, WCDMA, and HSPA, to be LTE and LTE-advanced, and may be applicable to resource allocation in a synchronous wireless communication scheme that is advanced through CDMA and CDMA-2000, to be UMB. The present disclosure may not be limited to a specific wireless communication field, and may include all technical fields to which the technical idea of the present disclosure is applicable.

Uplink transmission and downlink transmission may be performed based on a Time Division Duplex (TDD) scheme that performs transmission based on different times, or based on an Frequency Division Duplex (FDD) scheme that performs transmission based on different frequencies.

Further, in a system such as LTE and LTE-A, a standard may be developed by configuring an uplink and a downlink based on a single carrier or a pair of carriers. The uplink and the downlink may transmit control information through a control channel, such as a Physical Downlink Control Channel (PDCCH), a Physical Control Format Indicator Channel (PCFICH), a Physical Hybrid ARQ Indicator Channel (PHICH), a Physical Uplink Control Channel (PUCCH), an Enhanced Physical Downlink Control Channel (EPDCCH), and the like, and may be configured as a data channel, such as a Physical Downlink Shared Channel (PDSCH), a Physical Uplink Shared Channel (PUSCH), and the like, so as to transmit data.

Control information may be transmitted using an enhanced PDCCH or extended PDCCH (EPDCCH).

In the present specification, a cell may refer to the coverage of a signal transmitted from a transmission/reception point, a component carrier having the coverage of the signal transmitted from the transmission/reception point (transmission point or transmission/reception point), or the transmission/reception point itself.

A wireless communication system, to which embodiments of present disclosure are applied, may be a coordinated multi-point transmission/reception system (CoMP system), in which two or more coordinated transmission/reception points transmit signals, a coordinated multi-antenna transmission system, or a coordinated multi-cell communication system. The CoMP system may include at least two multiple transmission/reception points and a UE.

The multiple transmission/reception points may be at least one RRH that is connected to a base station or a macro-cell (hereinafter, referred to as "eNB") by optical cables or optical fibers to be controlled, and that has high transmission power or low transmission power in the macro-cell area.

Hereinafter, the term "downlink" means communication or a communication path from the multiple transmission/reception points to the UE, and the term "uplink" means communication or a communication path from the UE to the multiple transmission/reception points. In the downlink, a transmitter may be one of multiple transmission/reception points and a receiver may be a part of the UE. In the uplink, a transmitter may be a part of the UE and a receiver may be a part of multiple transmission/reception points.

Hereinafter, the situation in which a signal is transmitted and received through a PUCCH, a PUSCH, a PDCCH, a PDSCH, or the like may be described through the expression, "a PUCCH, a PUSCH, a PDCCH, or a PDSCH is transmitted or received".

In addition, hereinafter, the expression "a PDCCH is transmitted or received, or a signal is transmitted or received through a PDCCH" includes "an EPDCCH is transmitted or received, or a signal is transmitted or received through an EPDCCH".

That is, a downlink control channel used herein may indicate a PDCCH or an EPDCCH, and may indicate a meaning including both a PDCCH and an EPDCCH.

In addition, for ease of description, an EPDCCH, which corresponds to an embodiment of the present disclosure, may be applied to the part described using a PDCCH and to the part described using an EPDCCH.

Hereinafter, higher layer signaling includes an RRC signaling that transmits RRC information including an RRC parameter.

An eNB executes downlink transmission to UEs. The eNB 110 may transmit a Physical Downlink Shared Channel (PDSCH) which is a primary physical channel for unicast transmission. The eNB 110 may transmit a Physical Downlink Control Channel (PDCCH) for transmitting downlink control information, such as scheduling required for reception of a PDSCH, and scheduling grant information for transmission of an uplink data channel (for example, a Physical Uplink Shared Channel (PUSCH)). Hereinafter, transmission and reception of a signal through each channel will be described as transmission and reception of a corresponding channel.

Modulation refers to transforming signal information such as intensity, displacement, frequency, phase, or the like of a signal into a predetermined waveform to be appropriate for the channel characteristics of a transmission medium. In addition, digital modulation refers to transforming a digital signal (e.g., a digital symbol sequences) for transmitting digital information in correspondence with one of various available signals (a signal set), into a signal appropriate for a channel characteristic. As a representative digital modulation scheme which has high bandwidth efficiency, a M-ary QAM modulation scheme expressed by $2^M$ QAM, such as, QPSK (or 4QAM), 16QAM, and 64QAM, are used. Here, M denotes a modulation order, which indicates the number of digital symbols that are modulated for each time, and the modulation orders of QPSK, 16QAM, 64QAM, and 256QAM are 2, 4, 6, and 8, respectively.

A modulation scheme used for downlink data transmission in 3GPP LTE includes QPSK, 16QAM, and 64QAM. A base station selects one of the above described modulation schemes based on a downlink channel state, and informs a UE of the same using Downlink Control Information (DCI).

FIG. 1 is a table showing relationship among modulation orders, MCS indexes, and TBS indexes.

A modulation and coding scheme (MCS) index, included in DCI, is famed of 5 bits. The MCS index may inform the UE of a modulation scheme used for transmission, which is one of the three modulation methods, as shown in FIG. 1. In FIG. 1, MCS index 0 to MCS index 28 may be used to indicate initial transmission of a hybrid automatic repeat request (HARQ), and MCS index 29 to MCS index 31 may be used to indicate re-transmission of the HARQ.

More specifically, MCS index 0 to MCS index 9 may be used to indicate that the QPSK modulation method is used for downlink data transmission in, and MCS index 10 to MCS index 16 may be used to indicate that 16QAM modulation method is used for downlink data transmission. In addition, MCS index 17 to MCS index 28 may be used to indicate that 64QAM modulation method is used for downlink data transmission.

As described above, a plurality of MCS indexes may indicate the same modulation method, and each MCS index may denote that data can be transmitted using codewords of different code rates. In a good channel state, a base station increases bandwidth efficiency using a high MCS index, and in a bad channel state, the base station performs robust transmission using a low MCS index in order to cope with the channel state. That is, a MCS may be adjusted according to a channel state. Such an operation may be referred to as "link adaptation". That is, the link adaptation denotes the operation of adjusting the MCS index by compensating wireless channel characteristics that vary depending on time, in order to maximize a system processing rate.

While MCS index 0 to MCS index 28 may be used to indicate initial transmission of the HARQ, MCS index 29, MCS index 30, and MCS index 31 may be used to distinguish a modulation scheme used for re-transmission of the HARQ. That is, MCS index 29, MCS index 30, and MCS index 31 may indicate QPSK modulation, 16QAM, and 64QAM, used for re-transmission of the HARQ, respectively.

Referring to FIG. 1, each MCS index $I_{MCS}$ is respectively mapped to an associated transport block size (TBS) index $I_{TBS}$. Per each TBS index $I_{TBS}$, a TBS is defined to have a size of information bits that can transmit 110 physical resource block (PRB) pairs, considering that a transmission resource size from one pair of physical resource blocks (PRBs) to 110 pairs of PRBs can be allocated to the UE according to the definition of the 3GP TS 36.213 document.

FIG. 2 is a graph illustrating CQI block error rate (BLER) performance, and FIG. 3 is a typical CQI index table.

The UE should feed information on the channel state back to the base station for link adaptation of the base station according to the channel state of the UE. The information that is fed back to the base station by the UE is called channel state information (CSI). The channel state information (CSI) includes a pre-coding matrix indicator (PMI), a rank indicator (RI), and a channel quality indicator (CQI). Here, the PMI and the RI are the channel state information related to multiple-input multiple-output (MIMO) transmission, the CQI indicates modulation methods, a code rate value (code rate×1024), and a transmission efficiency (=modulation order×code rate value), which can be used according to the channel state of the UE. In a good channel state, the UE feeds a CQI index indicating a high transmission efficiency to the base station, and in a bad channel state, the UE feeds a CQI index indicating a low transmission efficiency to the base station.

A size of typical CQI feedback information is 4 bits. The typical CQI feedback information shows sixteen transmission efficiencies s. FIG. 2 shows required SNR values that satisfy a block error rate (BLER) of 10% with respect to a transmission efficiency depending on CQI performance of FIG. 3, in the experimental environment considering a single transmission antenna and two reception antennas in the AWGN channel environment. In FIG. 2, required SNR values at a BLER 10% in typical CQI indexes have a range of about −10 dB to 17 dB. Each CQI index is assigned with a transmission efficiency to have a uniform interval of a SNR, such as a uniform interval of 1.9 dB.

FIG. 4 illustrates a mapping table of a typical CQI index table including MCS indexes, and TBS indexes.

The base station identifies the CQI index received from the UE. The base station determines an amount of resource allocated to the UE and the MCS index to be used for transmission, based on the received CQI index. At this time, the MCS index set forth in FIG. 1 and the CQI index of FIG. 3 have the relation as shown in FIG. 4.

Referring to FIG. 4, MCS indexes ($I_{MCS}$) 0, 2, 4, 6, 8, 11, 13, 15, 18, 20, 22, 24, 26, and 28 may be configured to have the same transmission efficiency as that of CQI indexes 2, 3, 4, 5, 6, 7, 8, 9, 10, 11, 12, 13, 14 and 15, respectively. In addition, an MCS index positioned between two consecutive CQI indexes is configured to have an intermediate transmission efficiency value between transmission efficiency values of two CQI indexes.

However, MCS index 9 and MCS index 10, by which the modulation order is changed from QPSK into 16QAM, have the same transmission efficiency value, and MCS index 16 and MCS index 17, by which the modulation order is changed from 16QAM into 64QAM, have the same transmission efficiency value as well. In addition, since the MCS indexes that have different modulation orders are configured to have the same TBS index, the same TBS index may be transmitted with respect to the same amount of transmission resource.

The base station identifies the channel state through the CQI index received from the UE, and selects a size of transmission resource allotment to the UE and the MCS to be used in the corresponding transmission resources, based on the received CQI index. At this time, determination of a code rate value of the MCS is the same as the determination of the TBS that is a size of information bits to be transmitted by the corresponding transmission resource.

The present disclosure suggests an apparatus and a method for transmitting and receiving channel state information that is transmitted from the UE to the base station in the case where 256QAM is added to the typical three modulation methods, such as QPSK, 16QAM, and 64QAM, in order to increase transmission traffic and a transmission speed. More specifically, the present disclosure suggests an apparatus and a method for configuring CQI indexes included in the channel state information.

Since the typical modulation methods do not have a CQI index indicating 256QAM, it is required to define a CQI index corresponding to the modulation method of 256QAM in order to transmit data using 256QAM. That is, when 64QAM and 256QAM are used in the same transmission efficiency, the CQI index for 256QAM needs to be defined so that 256QAM is used at a transmission efficiency value at which the BLER performance of 256QAM is equal to or better than that of 64QAM.

Figure 5:
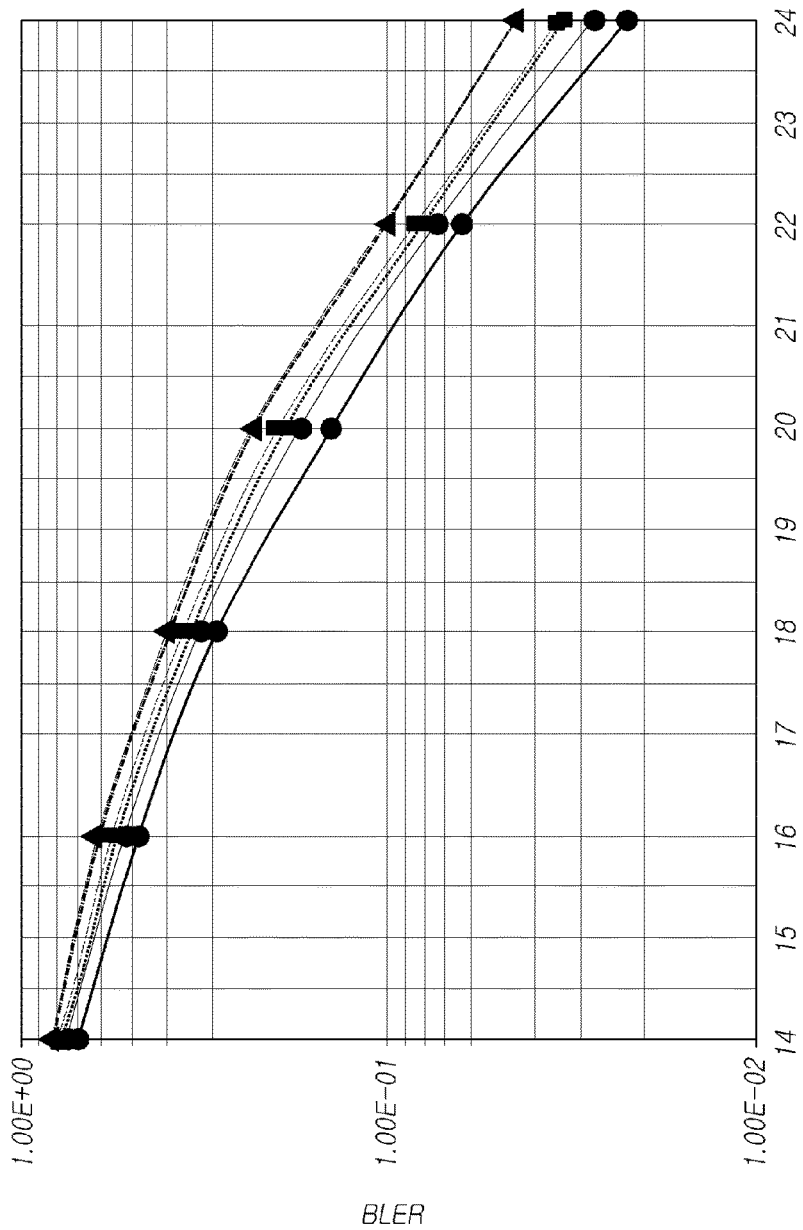
FIG. 5 is a diagram illustrating BLER performance of 64QAM and 256QAM at a transmission efficiency of 5.333, 5.460 and 5.587 in a channel model of EPA 3 km/h.

FIG. 5 is a graph illustrating BLER performance of 64QAM and 256QAM at a transmission efficiency of 5.333, 5.460 and 5.587 in a channel model of Extended Pedestrian A model (EPA) 3 km/h.

Referring to FIG. 5, the BLER performance of 64QAM is the same as that of 256QAM at a transmission efficiency value of 5.587. Accordingly, in the present disclosure, considering that the maximum transmission efficiency value is 5.5547 in the typical CQI index table in FIG. 3, a new CQI index using the modulation method of 256QAM is configured to support a transmission efficiency value equal to or greater than the typical transmission efficiency value of 5.5547.

In order to define a new CQI index supporting 256QAM with a size, i.e., 4 bits, of the typical CQI feedback information maintained, some of the typical CQI indexes should be removed to thereby define a new transmission efficiency.

According to an embodiment of the present disclosure, considering that the TBS indexes are configured to support VoIP services from $I_{TBS}$ 0 to $I_{TBS}$ 16 in the typical TBS table, CQI index 0 to CQI index 10 corresponding to $I_{TBS}$ 16 may not be removed to define new CQI indexes. That is, in order not to have an influence on VoIP services, typical CQI indexes 0 to 10 may be reused, and CQI indexes 11 to 15 may be defined with transmission efficiency supporting 64QAM and 256QAM.

In another embodiment, the typical CQI indexes 0 to 10 may be newly defined, and the CQI indexes 11 to 15 for 64QAM and 256QAM may be newly defined as well.

Figure 6:
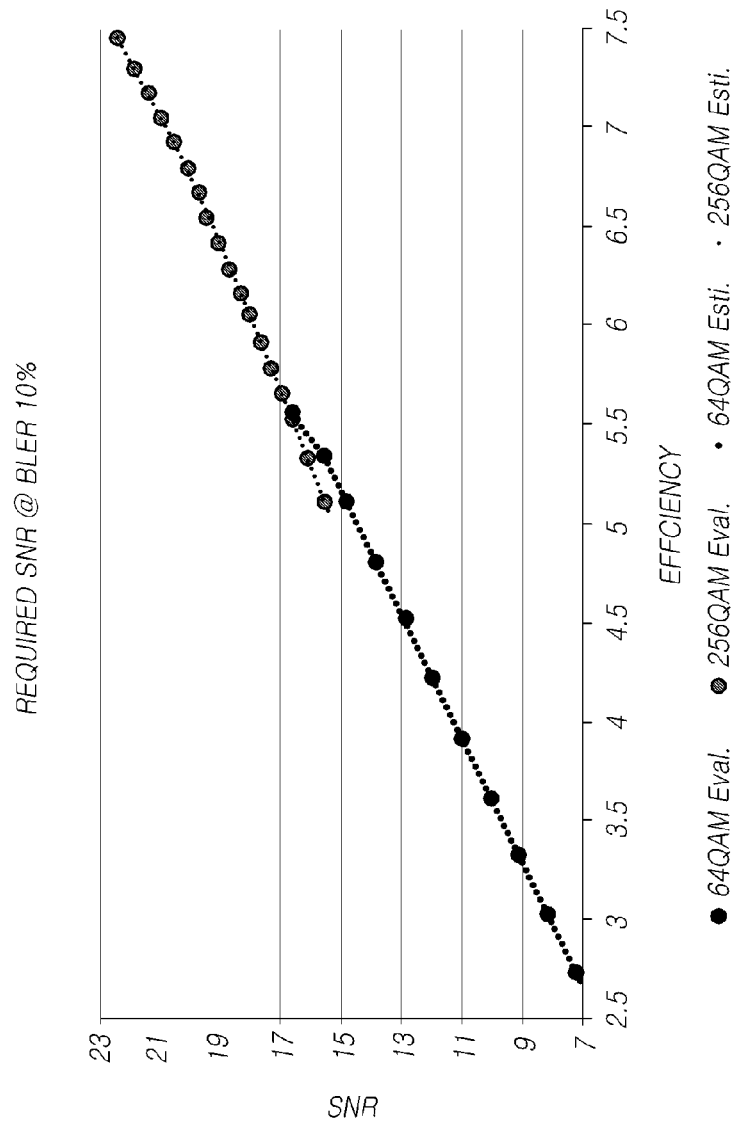
FIG. 6 is a diagram illustrating a required signal to noise ratio (SNR) at a BLER of 10% depending on the transmission efficiency of 64QAM and 256QAM.

FIG. 6 is a graph illustrating a required signal to noise ratio (SNR) at a BLER of 10% depending on transmission efficiency of 64QAM and 256QAM.

FIG. 7 is a table showing an example of transmission efficiency of 64QAM and required SNR values in FIG. 6.

FIG. 8 is a table showing an example of transmission efficiency of 256QAM and required SNR values in FIG. 6.

FIG. 7 shows the transmission efficiency of 64QAM and required SNR values in FIG. 6, and FIG. 8 shows the transmission efficiency of 256QAM and required SNR values in FIG. 6.

In the present disclosure, in order to calculate an estimated required SNR depending on the transmission efficiency, Equation 1 is used for the transmission efficiency using 64QAM, and Equation 2 is used for the transmission efficiency using 256QAM. In the following Equations 1 and 2, R=code rate×2014. In addition, R is expressed by a code rate value in the present specification.

IF $R \leq 888$,

Estimated Required SNR=$0.0187*R-1.504$

ELSE,

Estimated Required SNR=$4.164532*10^{-5}*R^2- 0.0514*R+27.906$  Equation 1

IF $R \leq 874$,

Estimated Required SNR=$0.0213*R+1.5599$

ELSE,

Estimated Required SNR=$3.196*10^{-5}*R^2- 0.0303*R22.24$  Equation 2

As shown in FIG. 6, FIG. 7, and FIG. 8, there is very little difference between the estimated required SNR value using Equation 1 and Equation 2 above and actual values measured in the experimental environment set forth above. That is, FIGS. 7 and 8 show that "Esti.Reg.SNR−Eval.Reg.SNR" is nearly zero.

Now, a method for transmitting and receiving channel state information including new CQI indexes will be described.

Figure 9:
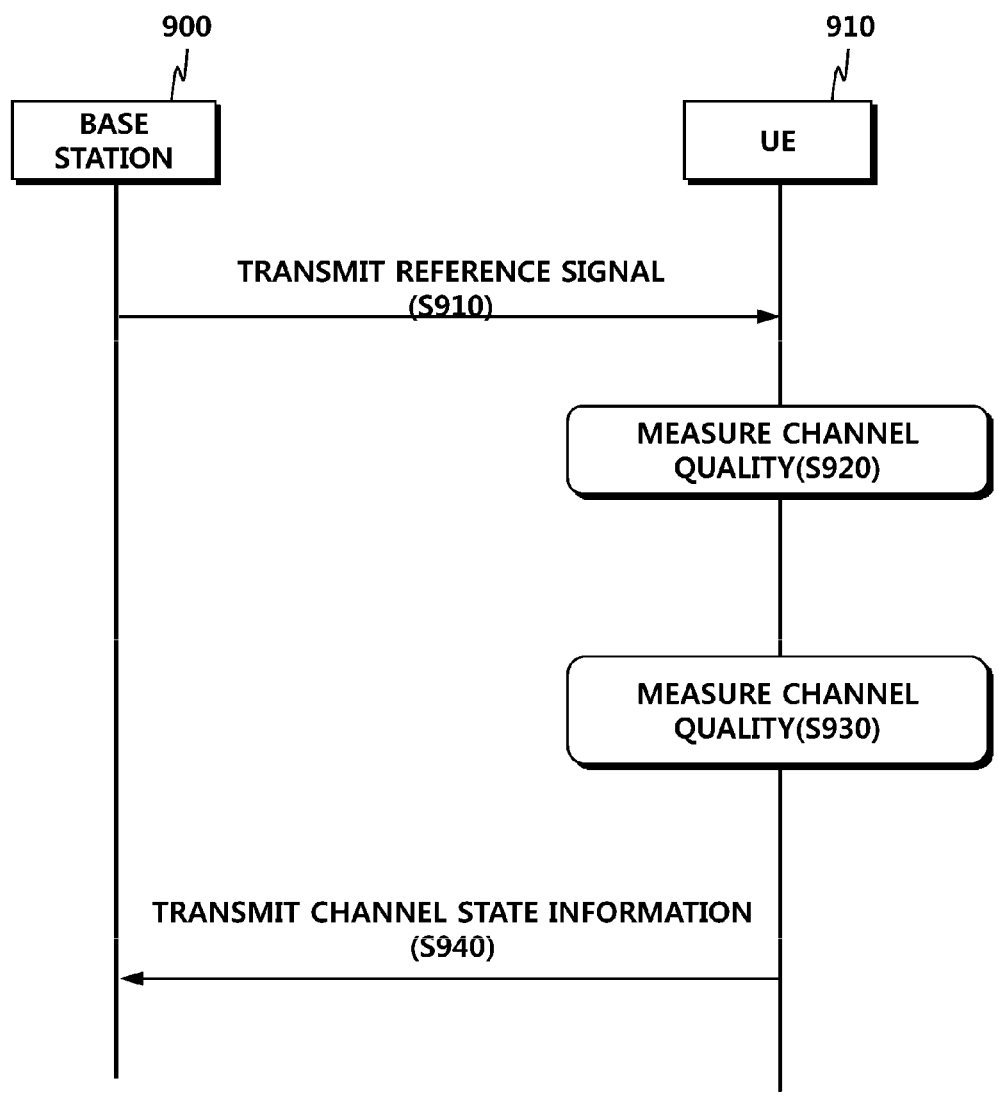
FIG. 9 is a signal flow diagram illustrating operations of a UE and a base station according to an embodiment of the present disclosure.

FIG. 9 is a signal flow diagram illustrating operations of a UE and a base station according to an embodiment of the present disclosure.

A method for transmitting channel state information by a UE, according to an embodiment of the present disclosure, may include: receiving a reference signal for measuring channel quality from a base station; measuring the channel quality based on the reference signal, and selecting a CQI index value from a predetermined CQI index table including CQI index values for 256QAM modulation, based on the measurement result of the channel quality; and transmitting channel state information including the selected CQI index value to the base station.

A method for receiving channel state information by a base station, according to an embodiment of the present disclosure, may include: creating a reference signal for measuring channel quality; transmitting the reference signal to a UE; and receiving channel state information including a CQI index selected from a predetermined CQI index table including CQI index values for 256QAM modulation, based on a measurement result of the channel quality, from the UE.

Referring to FIG. 9, the base station 900 of the present disclosure needs to identify information on downlink channel characteristics of the base station 900 and the UE 910, in order to transmit downlink data to the UE 910. To this end, the base station 900 may create a reference signal for measuring the downlink channel features, and may transmit the same to the UE 910 (S910). The reference signal for measuring the downlink channel characteristics may be CRS or CSI-RS, but it is not limited thereto.

The UE 910 may receive the reference signal from the base station 900, and may measure channel quality. Afterwards, according to the measurement result of the channel quality, the UE 910 may select a CQI index value corresponding to the measurement result of the channel quality using the CQI index table (S930).

The UE 910 may transmit channel state information including the selected CQI index value to the base station 900. As mentioned above, the channel state information (CSI) may include the PMI, the RI, and the CQI, and the CQI may have a size of 4 bits.

The base station 900 may determine an amount of resource allocation using the received channel state information, and may determine an MCS that conforms to the channel characterisitics to thereby transmit downlink data to the UE 910.

Meanwhile, in selecting the CQI index value, the UE 910 of the present disclosure may select a CQI index value corresponding to the measurement result of the channel quality from the CQI index table including 256QAM rather than the typical CQI index table. Accordingly, a new CQI index table different from the typical CQI index table needs to be configured, and in order to effectively process data traffic and increase a transmission speed, it is very important to effectively configure a CQI index table including a CQI index value for 256QAM.

Therefore, according to various embodiments of the present disclosure, a method for configuring a CQI index table including a CQI index value of 256QAM, to which the UE refers, will be described in detail hereinafter.

The First Embodiment

A method for configuring a CQI index table according to the first embodiment of the present disclosure may configure a CQI index table by defining transmission efficiency for five new CQI indexes that are added based on typical CQI index 10.

In the first detailed method, the transmission efficiency may be configured to have uniform difference of required SNR between two adjacent CQI indexes at a BLER of 10% from a CQI index 10. Provided that a code rate value that is used for the maximum transmission efficiency of a new CQI index is expressed as "R", the maximum value of "R" may be defined as 948 as shown in FIG. 3.

In this case, the required SNR of CQI index 10 may be used as the minimum SNR, and the required SNR calculated by Equation 2 at R=948 set forth above may be used as the maximum SNR. Accordingly, the SNR interval between adjacent CQI indexes may be obtain from the following Equation 3.

$$\text{SNR Interval} = (\text{Maximum SNR} - \text{Minimum SNR})/5 = (22.2382 - 7.2095)/5 = 3.0057 \qquad \text{Equation 3}$$

FIG. 10 is a table showing target SNRs respectively assigned with CQI index values according to the first embodiment of the present disclosure.

Target SNRs may be defined from CQI index 11 to CQI index 15 as shown in FIG. 10 using the SNR interval value that is calculated according to Equation 3.

Afterwards, "R" values almost approximating the target SNRs of the CQI indexes in FIG. 10 may be calculated by considering both modulation methods, i.e., 64QAM and 256QAM. In the case of 64QAM, an SNR value is calculated with respect to a certain "R" value using Equation 1, and then the calculated SNR value is compared with the target SNR to obtain a difference between them. In the case of 256QAM, an SNR value is calculated with respect to a certain "R" value using Equation 2, and then the calculated SNR value is compared with the target SNR to obtain a difference between them. At this time, 952 is used as the maximum "R" value in 64QAM, and 714 is used as the minimum "R" value in 256QAM.

In other words, SNR values may be calculated with respect to a certain "R" value using Equation 1 and Equation 2, and the calculated values may be compared with the target SNRs to get differences. After that, an value corresponding to the minimum difference and a modulation method considered in calculating the SNRs may be defined as the transmission efficiency of a new CQI. FIG. 11 shows the transmission efficiencies from CQI index 11 to CQI index 15, which is defined so that differences of the required SNRs between adjacent CQI indexes are almost the same, according to the method mentioned above. FIG. 11 illustrates an example of a CQI index table according to the first embodiment of the present disclosure.

FIG. 12 illustrates another example of a CQI index table according to the first embodiment of the present disclosure.

In the second detailed method, the maximum value of "R" to be used for the maximum transmission efficiency of a new CQI may be defined as 952, considering the maximum code rate, i.e., 0.93≈952/1024 that has been used in configuring the typical TBS. In this case, the transmission efficiency of CQI index 11 to CQI index 15, which is defined in the same manner as the first detailed method in which differences of the required SNRs between adjacent CQI indexes are almost the same, is shown in FIG. 12.

The Second Embodiment

A method for configuring a CQI index table according to the first embodiment of the present disclosure provides a method for configuring the transmission efficiency of five new CQI indexes that are added on the basis of typical CQI index 10.

The first detailed method provides a method for reusing typical MCS indexes that have been used for 64QAM. The MCS indexes may be selected so that differences of estimated required SNRs at a BLER of 10% between the adjacent CQI indexes are almost the same, including CQI index 10 (or MCS index 18), from among MCS index 18 to MCS index 28 that have been used for typical 64QAM in FIG. 4 described above.

FIG. 13 illustrates an example of MCS indexes reused for new CQI indexes of 64QAM according to the second embodiment of the present disclosure.

The CQI indexes newly defined above may be mapped as new MCS indexes when defining a new MCS table supporting 256QAM. At this time, since the TBS indexes that satisfy transmission efficiency of the newly defined CQI indexes have already been defined in the TBS table, the typical TBS indexes can be reused without defining new TBS indexes again, compared to the first embodiment.

The CQI indexes for 64QAM may be defined in the method described above, and the remaining two indexes may be defined with the transmission efficiency used in 256QAM.

FIG. 14 illustrates an example of a CQI index table according to the second embodiment of the present disclosure.

In the first embodiment, the required SNR of CQI index 13 in FIG. 13 may be used as the minimum SNR, and the required SNR calculated using R=948 in Equation 2 set forth above may be used as the maximum SNR, as described above. Accordingly, the transmission efficiencies of CQI index 14 and CQI index 15 are defined in the same manner as the first embodiment so that differences of required SNRs between the adjacent CQI indexes are almost the same, as shown in FIG. 14.

FIG. 15 illustrates another example of a CQI index table according to the second embodiment of the present disclosure.

As a second detailed method, the required SNR of CQI index 13 in FIG. 13 may be used as the minimum SNR, and the required SNR calculated using R=952 in Equation 2 set forth above may be used as the maximum SNR. In this case, the transmission efficiencies of CQI index 14 and CQI index 15 are defined in the same manner as the first embodiment so that differences of required SNRs between the adjacent CQI indexes are almost the same as shown in FIG. 15.

As a third detailed method, while remaining CQI index 10 to CQI index 14 of FIG. 11 and FIG. 15, an "R" value of CQI index 15 may be used after changing it into 952.

As a fourth detailed method, while remaining CQI index 10 to CQI index 14 of FIG. 12 and FIG. 15, an "R" value of CQI index 15 may be used after changing it into 948.

The first embodiment and the second embodiment described above do not influence the typical VoIP TBS indexes. In this case, differences of required SNRs between the adjacent CQI indexes are configured to be relatively small in a low SNR section where QPSK and 16QAM are used. However, differences of required SNRs between the adjacent CQI indexes are configured to be relatively large in a high SNR section where 64QAM and 256QAM are used.

Hereinafter, the third embodiment of the present disclosure in which differences of required SNRs between adjacent CQI indexes are configured to be relatively small in a high SNR section where 64QAM and 256QAM are used, will be described with reference to the drawings.

The Third Embodiment

The third embodiment of the present disclosure shows a method for configuring a CQI index table in which differences of required SNRs between adjacent CQI indexes in a high SNR section, where 64QAM and 256QAM are used, are configured to be relatively small, by eliminating some of the CQI indexes in a low SNR section.

FIG. 16 illustrates an example of a CQI index table up to 64QAM according to the third embodiment of the present disclosure.

First, some of CQI indexes in FIG. 3 may be eliminated so that differences of required SNRs between adjacent CQI indexes are almost constant from among the typical CQI indexes for QPSK. For example, CQI index 2, CQI index 3, and CQI index 6 of FIG. 3 may be eliminated.

In addition, the CQI entry except for CQI index 15 that shows the same BLER performance as 256QAM with respect to the same transmission efficiency as shown in FIG. 5 may be replaced with a new CQI entry. A new CQI table configured in such a manner is shown in FIG. 16 in part.

That is, a CQI index table that includes predetermined CQI index values for 256QAM modulation selected by the UE, may include three CQI index values for QPSK modulation, three CQI index values for 16QAM modulation, five CQI index values for 64QAM modulation, and four CQI index values for 256QAM modulation.

Next, in order to configure a CQI index table of the present disclosure, various detailed methods for defining R12, R13, R14, and R15 corresponding to CQI indexes 12, 13, 14, and 15 will be described.

In the first detailed method for defining R12, R13, R14, and R15, the required SNR of CQI index 11 in FIG. 16 may be used as the minimum SNR, and the required SNR calculated using R=948 in Equation 2 set forth above may be used as the maximum SNR. The SNR interval value calculated using the first detailed method may be expressed as Equation 4.

$$SNR \text{ Interval} = (\text{Maximum } SNR - \text{Minimum Interval})/4 = \text{Equation 4}$$
$$(22.2382 - 14.8204)/4 = 1.8544$$

Target SNRs may be defined using the SNR interval value calculated by Equation 4 as in FIG. 17. FIG. 17 illustrates an example of target SNRs in the 256QAM modulation method according to the third embodiment of the present disclosure.

FIG. 18 illustrates an example of a CQI index table in the 256QAM modulation method according to the third embodiment of the present disclosure.

"R" values are determined so that differences of the required SNRs between adjacent CQI indexes are almost the same using required SNRs of FIG. 17 and Equation 2. Thus, "R" values that satisfy the target SNRs may be calculated as shown in FIG. 18.

FIG. 19 illustrates another example of target SNRs in the 256QAM modulation method according to the third embodiment of the present disclosure.

According to the second detailed method, in the CQI index table provided by the present disclosure, considering that the maximum code rate that has been used for configuring the typical TBS is 0.93≈952/1024, the maximum value of "R" to be used for the maximum transmission efficiency of a new CQI index may be defined as 952.

In this case, the required SNR of CQI index 11 in FIG. 16 may be used as the minimum SNR, and the required SNR calculated using R=952 in Equation 2 set forth above may be used as the maximum SNR. Target SNRs with respect to CQI indexes 12, 13, 14, and 15 may be defined as shown in FIG. 19.

FIG. 20 illustrates another example of a CQI index table in the 256QAM modulation method according to the third embodiment of the present disclosure.

"R" values are determined so that differences of the required SNRs between adjacent CQI indexes are almost the same using required SNRs of FIG. 19 and Equation 2. Thus, "R" values that satisfy the target SNRs may be calculated as shown in FIG. 20.

In the third detailed method, according to another embodiment of the present disclosure, while CQI indexes 12 to 14 of FIG. 18 described above remain, an "R" value of CQI index 15 may be changed into 952.

In the fourth detailed method, according to another embodiment of the present disclosure, while the CQI indexes 12 to 14 of FIG. 20 described above remain, an "R" value of CQI index 15 may be changed into 948.

In the fifth detailed method, according to another embodiment of the present disclosure, a CQI index having the lowest transmission efficiency among the CQI indexes for 256QAM, may be configured to have the same transmission efficiency as the typical CQI index that has the highest transmission efficiency. That is, while the CQI indexes 13 to 15 of FIG. 18 remain, an "R" value of CQI index 12 may be changed into 711 as shown in FIG. 21. FIG. 21 illustrates still another example of a CQI index table in the 256QAM modulation method according to the third embodiment of the present disclosure.

The UE may select a CQI index value using the CQI index table newly configured as described above. Hereinafter, operations of the UE and the base station in the fifth detailed method according to the third embodiment above will be described with reference to FIG. 22 and FIG. 23.

Figure 22:
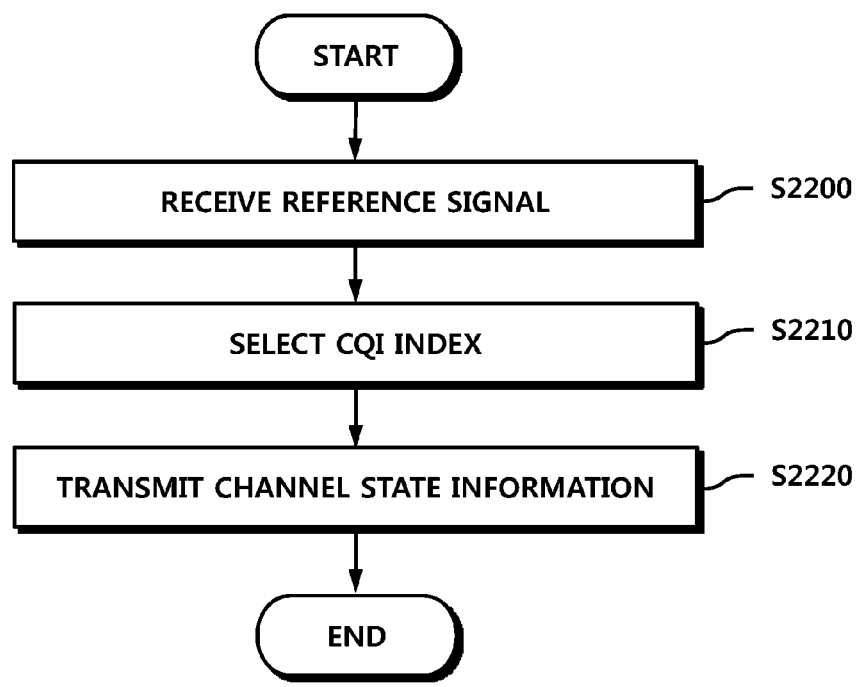
FIG. 22 is a flowchart illustrating an operation of a UE according to another embodiment of the present disclosure.

FIG. 22 is a flowchart illustrating an operation of a UE according to another embodiment of the present disclosure.

The method for transmitting channel state information by a UE, according to the present disclosure, may include: receiving a reference signal for measuring channel quality from a base station; measuring the channel quality based on the reference signal, and selecting a CQI index value from a predetermined CQI index table including CQI index values for 256QAM modulation, based on the measurement result of the channel quality; and transmitting channel state information including the selected CQI index value to the base station.

Referring to FIG. 22, the UE may receive a reference signal for measuring channel quality from the base station (S2200). The reference signal for measuring channel quality may be signals, such as CSI or CSI-RS, but it is not limited thereto.

The UE may measure the channel quality, based on the reference signal, and may select a CQI index value from a CQI index table including predetermined CQI index values for 256QAM modulation, based on the measurement result of the channel quality (S2210). That is, the UE may measure the downlink channel quality using the reference signal. Afterwards, the UE may select a CQI index value corresponding to the channel quality using the measured downlink channel quality and a predetermined CQI index table.

The CQI index table may be variously configured as described in the embodiments above.

For example, the CQI index table may include three CQI index values for QPSK modulation, three CQI index values for 16QAM modulation, five CQI index values for 64QAM modulation, and four CQI index values for 256QAM modulation. That is, CQI index values supporting 256QAM, which can be newly defined, may be added with 4 bits for CQI information maintained.

More specifically, the CQI index table may be configured so that differences of the required SNRs between adjacent CQI index values in three CQI index values for QPSK modulation, three CQI index values for 16QAM modulation, and five CQI index values for 64QAM modulation, respectively, are almost the same within a predetermined error rate as in FIG. 16.

In addition, the code rate value (R) for four 256QAM indexes may be calculated according to each detailed method of the third embodiment as set forth above.

For example, one of CQI index values for 256QAM modulation may be configured to have a code rate value that supports the same transmission efficiency as the maximum transmission efficiency of a CQI index table that does not include CQI index values for 256QAM modulation. For example, CQI index 12 of FIG. 21 may be configured to have a code rate value of 711 corresponding to the maximum transmission efficiency, i.e., 5.5547 of FIG. 3. That is, the code rate value may be calculated to be 711 using "code rate×1024."

For another example, one of CQI index values for 256QAM modulation may be configured to have the same code rate value as the code rate value having the maximum transmission efficiency of a CQI index table that does not include CQI index values for 256QAM modulation. For example, CQI index 15 of FIG. 21 may be configured to have a code rate value of 948 identical to the code rate value that has the maximum transmission efficiency of FIG. 3. That is, the code rate value may be defined as "code rate×1024," and may be configured to be 948.

For another example, one of CQI index values for 256QAM modulation may be configured by a code rate value that is determined by an SNR interval calculated using the minimum SNR that is a required SNR of a CQI index having the maximum code rate value among CQI index values for 64QAM modulation of the CQI index table, and the maximum SNR that is a required SNR of a CQI index having the maximum code rate value among CQI index values for 256QAM modulation of the CQI index table. For example, the minimum SNR may be the required SNR of CQI index 11 of FIG. 16, and the maximum SNR may be the required SNR calculated using Equation 2 and R=948. The target SNR may be obtained using an SNR interval value that is determined by applying the minimum SNR and the maximum SNR to Equation 4, as shown in FIG. 17, and a code rate value (R) may be configured so that differences of required SNRs between adjacent CQI indexes are almost the same using the required SNR and Equation 2. The SNR interval may be calculated by subtracting the minimum SNR from the maximum SNR and then dividing the subtraction result by 4. The code rate value obtained in such a manner may be configured to be 797 as CQI index 13 in FIG. 18 or FIG. 21. That is, the code rate value may be defined as "code rate×1024," and may be configured to be 797.

As described above, the CQI index table newly defined to include 256QAM may include each CQI index using the method set forth above.

The UE may transmit channel state information including CQI index values to the base station (S2220). That is, the UE may include the CQI index value selected by the method above in the channel state information and may transmit the same to the base station.

Afterwards, the UE may receive a determined MCS value and downlink data from the base station, and may demodulate the same.

Figure 23:
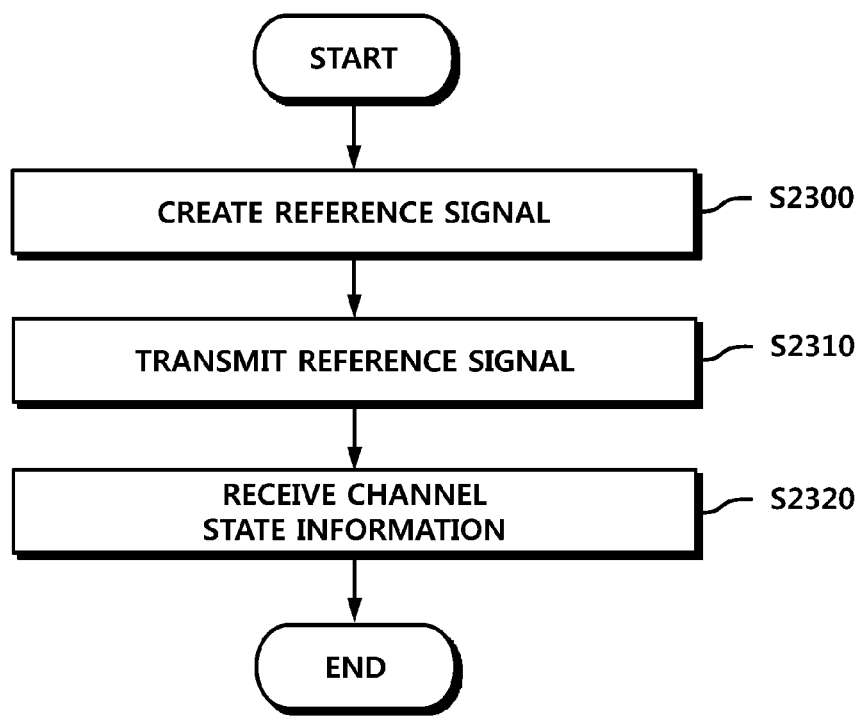
FIG. 23 is a flowchart illustrating an operation of a base station according to another embodiment of the present disclosure.

FIG. 23 is a flowchart illustrating an operation of a base station according to another embodiment of the present disclosure.

Referring to FIG. 23, a method for receiving channel state information by a base station, according to the present disclosure, may include: creating a reference signal for measuring channel quality; transmitting the reference signal to a UE; and receiving channel state information including a CQI index selected from a predetermined CQI index table including CQI index values for 256QAM modulation, based on a measurement result of the channel quality, from the UE.

Referring to FIG. 23, the base station may create a reference signal for measuring the channel quality (S2300). The base station may transmit the reference signal to the UE (S2310). The reference signal for measuring the channel quality may be signals, such as, CRS or CSI-RS, but it is not limited thereto.

Afterwards, the base station may receive the channel state information including the CQI index value selected based on the measurement result of the channel quality from a CQI index table including predetermined CQI index values for 256QAM modulation, from the UE (S2320).

The CQI index table may be variously configured as described in the embodiments above.

For example, the CQI index table may include three CQI index values for QPSK modulation, three CQI index values for 16QAM modulation, five CQI index values for 64QAM modulation, and four CQI index values for 256QAM modulation. That is, CQI index values supporting 256QAM, which can be newly defined, may be added with 4 bits for CQI information maintained.

More specifically, the CQI index table may be configured so that differences of the required SNRs between adjacent CQI index values in three CQI index values for QPSK modulation, three CQI index values for 16QAM modulation, and five CQI index values for 64QAM modulation, respectively, are almost the same within a predetermined error rate as in FIG. 16.

In addition, the code rate value (R) for four 256QAM indexes may be calculated according to each detailed method of the third embodiment as set forth above.

For example, one of CQI index values for 256QAM modulation may be configured to have a code rate value that supports the same transmission efficiency as the maximum transmission efficiency of a CQI index table that does not include CQI index values for 256QAM modulation. For example, CQI index 12 of FIG. 21 may be configured to have a code rate value of 711 corresponding to the maximum transmission efficiency, i.e., 5.5547 of FIG. 3. That is, the code rate value may be calculated to be 711 using "code rate×1024."

For another example, one of CQI index values for 256QAM modulation may be configured to have the same code rate value as the code rate value having the maximum transmission efficiency of a CQI index table that does not include CQI index values for 256QAM modulation. For example, CQI index 15 of FIG. 21 may be configured to have a code rate value of 948 identical to the code rate value that has the maximum transmission efficiency of FIG. 3. That is, the code rate value may be defined as "code rate×1024," and may be configured to be 948.

For another example, one of CQI index values for 256QAM modulation may be configured by a code rate value that is determined by an SNR interval calculated using the minimum SNR that is a required SNR of a CQI index having the maximum code rate value among CQI index values for 64QAM modulation of the CQI index table, and the maximum SNR that is a required SNR of a CQI index having the maximum code rate value among CQI index values for 256QAM modulation of the CQI index table. For example, the minimum SNR may be the required SNR of CQI index 11 of FIG. 16, and the maximum SNR may be the required SNR calculated using Equation 2 and R=948. The target SNR may be obtained using an SNR interval value that is determined by applying the minimum SNR and the maximum SNR to Equation 4, as shown in FIG. 17, and a code rate value (R) may be configured so that differences of required SNRs between adjacent CQI indexes are almost the same using the required SNR and Equation 2. The SNR interval may be calculated by subtracting the minimum SNR from the maximum SNR and then dividing the subtraction result by 4. The code rate value obtained in such a manner may be configured to be 797 as CQI index 13 in FIG. 18 or FIG. 21. That is, the code rate value may be defined as "code rate×1024," and may be configured to be 797.

As described above, the CQI index table newly defined to include 256QAM may include each CQI index using the method set forth above.

The CQI index table configured as described above may be stored in both the UE and the base station. Therefore, the UE and the base station may share information on the channel state through CQI index information of 4 bits.

Hereinafter, configurations of the UE and the base station, by which the present disclosure can be carried out, will be described with reference to FIG. 24 and FIG. 25.

Figure 24:
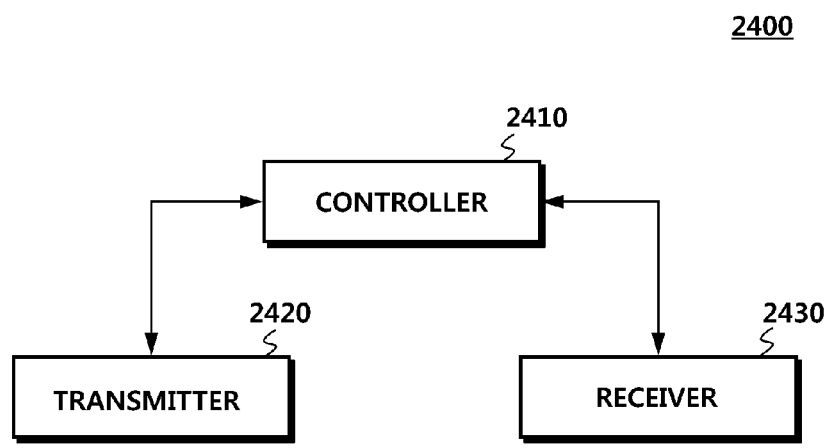
FIG. 24 is a diagram illustrating a configuration of a UE according to another embodiment of the present disclosure.

FIG. 24 is a diagram illustrating a configuration of UE according to another embodiment of the present disclosure.

Referring to FIG. 24, the UE 2400 of the present disclosure may include a receiver 2430, a controller 2410, and a transmitter 2420. The receiver 2430 receives a reference signal for measuring channel quality from the base station. The controller 2410 measures the channel quality based on the reference signal and selects a CQI index value from a CQI index table including predetermined CQI index values for 256QAM modulation, based on the measurement result of the channel quality. The transmitter 2420 transmits channel state information including the selected CQI index value to the base station.

The receiver 2430 may receive a reference signal for measuring the channel quality from the base station. The reference signal may be CRS or CSI-RS as set for the above, but it is not limited thereto and may include signals predetermined to measure the channel quality. In addition, the receiver 2430 may receive downlink control information, data, and messages from the base station through a corresponding channel.

The controller 2410 may measure the channel quality based on the reference signal. In addition, the controller 2410 may select a CQI index value from a CQI index table including predetermined CQI index values for 256QAM modulation, based on the measurement result of the channel quality. The CQI index table including predetermined CQI index values for 256QAM modulation may be configured in the methods of the first embodiment to the third embodiment as described above, or in the method described in FIG. 22.

Furthermore, the controller 2410 may control overall operations of the UE for transmission of the channel state information according to the present disclosure.

The transmitter 2420 may transmit the channel state information including the selected CQI index value to the base station. In addition, the transmitter 2420 may transmit uplink control information, data, and messages to the base station through the corresponding channel.

Figure 25:
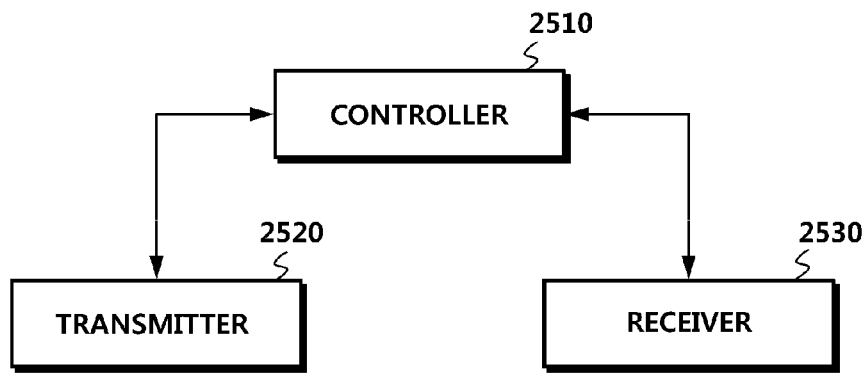
FIG. 25 is a diagram illustrating a configuration of a base station according to another embodiment of the present disclosure.

FIG. 25 is a diagram illustrating a configuration of a base station according to another embodiment of the present disclosure.

Referring to FIG. 25, the base station 2500 of the present disclosure may include a controller 2510, a transmitter 2520, and a receiver 2530. The controller 2510 creates a reference signal for measuring the channel quality. The transmitter 2520 transmits the reference signal to the UE. The receiver 2530 receives channel state information including the CQI index value selected from a CQI index table including predetermined CQI index values for 256QAM modulation, based on the measurement result of the channel quality, from the UE.

The controller 2510 may create a reference signal for measuring the channel quality, and may control the operation of the base station in carrying out the present disclosure.

The transmitter 2520 may transmit the reference signal to the UE. In addition, the transmitter 2520 may transmit signals, messages, and data, which are necessary for the operation of the present disclosure, to the UE.

The receiver 2530 may receive channel state information including a CQI index value selected from a CQI index table including predetermined CQI index values for 256QAM modulation, based on the result of the channel quality measurement, from the UE. The CQI index table including predetermined CQI index values for 256QAM modulation may be configured in the methods of the first embodiment to the third embodiment as described above, or in the method described in FIG. 22.

Furthermore, the receiver 2530 may receive signals, messages, and data, which are necessary for the operation of the present disclosure, from the UE.

Although the embodiments of the present disclosure have been described for illustrative purposes, those skilled in the art will appreciate that various modifications, additions and substitutions are possible, without departing from the scope and spirit of the disclosure. Therefore, the embodiments disclosed in the present disclosure are intended to illustrate the scope of the technical idea of the present disclosure, and the scope of the present disclosure is not limited by the embodiment. The scope of the present disclosure shall be construed on the basis of the accompanying claims in such a manner that all of the technical ideas included within the scope equivalent to the claims belong to the present disclosure.

The invention claimed is:

1. A method for transmitting channel state information by a User Equipment (UE), the method comprising:
   receiving a reference signal for measuring channel quality from a base station;
   measuring the channel quality based on the reference signal, and selecting a channel quality indicator (CQI) index value from a predetermined CQI index table including CQI index values for 256 quadrature amplitude modulation (QAM) modulation, based on the measurement result of the channel quality; and
   transmitting channel state information including the selected CQI index value to the base station,
   wherein:
   the CQI index table includes three CQI index values for QPSK modulation, three CQI index values for 16QAM modulation, five CQI index values for 64QAM modulation, and four CQI index values for 256QAM modulation;
   one of the four CQI index values for 256QAM modulation is configured to have one code rate value that supports a same transmission efficiency as a maximum transmission efficiency of a CQI index table that excludes CQI index values for 256QAM modulation; and
   another of the four CQI index values for 256QAM modulation is configured to have another code rate value same as the code rate value having a maximum transmission efficiency of a CQI index table that excludes CQI index values for 256QAM modulation; and
   wherein:
   the one code rate value of the one of the four CQI index values for 256QAM modulation is calculated to be 711 using "code rate×1024,"
   the another code rate value of the another of the four CQI index values for 256QAM modulation is calculated to be 948 using "code rate×1024," and
   a different another code rate value of a different another of the four CQI index values for 256QAM modulation is calculated to be 797 using "code rate×1024."

2. The method of claim 1, wherein the five CQI index values for 64QAM modulation, respectively, to have same difference within a predetermined error rate, as shown in a table below

| CQI index | modulation | code rate × 1024 | efficiency |
|---|---|---|---|
| 0 | | out of range | |
| 1 | QPSK | 78 | 0.1523 |
| 2 | QPSK | 193 | 0.3770 |
| 3 | QPSK | 449 | 0.8770 |
| 4 | 16QAM | 378 | 1.4766 |
| 5 | 16QAM | 490 | 1.9141 |
| 6 | 16QAM | 616 | 2.4063 |
| 7 | 64QAM | 466 | 2.7305 |
| 8 | 64QAM | 567 | 3.3223 |
| 9 | 64QAM | 666 | 3.9023 |
| 10 | 64QAM | 772 | 4.5234 |
| 11 | 64QAM | 873 | 5.1152. |

3. A method for receiving channel state information by a base station, the method comprising:
   creating a reference signal for measuring channel quality;
   transmitting the reference signal to a User Equipment (UE); and
   receiving channel state information including a channel quality indicator (CQI) index selected from a predetermined CQI index table including CQI index values for 256 quadrature amplitude modulation (QAM) modulation, based on a measurement result of the channel quality, from the User Equipment,
   wherein:
   the CQI index table includes three CQI index values for QPSK modulation, three CQI index values for 16QAM modulation, five CQI index values for 64QAM modulation, and four CQI index values for 256QAM modulation;
   one of the four CQI index values for 256QAM modulation is configured to have one code rate value that supports a same transmission efficiency as a maximum transmission efficiency of a CQI index table that excludes CQI index values for 256QAM modulation; and
   another of the four CQI index values for 256QAM modulation is configured to have another code rate value same as the code rate value having a maximum transmission efficiency of a CQI index table that excludes CQI index values for 256QAM modulation; and
   wherein:
   the one code rate value of the one of the four CQI index values for 256QAM modulation is calculated to be 711 using "code rate×1024,"
   the another code rate value of the another of the four CQI index values for 256QAM modulation is calculated to be 948 using "code rate×1024," and
   a different another code rate value of a different another of the four CQI index values for 256QAM modulation is calculated to be 797 using "code rate×1024."

4. The method of claim 2, wherein the five CQI index values for 64QAM modulation, respectively, to have same difference within a predetermined error rate, as shown in a table below

| CQI index | modulation | code rate × 1024 | efficiency |
|---|---|---|---|
| 0 | | out of range | |
| 1 | QPSK | 78 | 0.1523 |
| 2 | QPSK | 193 | 0.3770 |
| 3 | QPSK | 449 | 0.8770 |
| 4 | 16QAM | 378 | 1.4766 |
| 5 | 16QAM | 490 | 1.9141 |
| 6 | 16QAM | 616 | 2.4063 |
| 7 | 64QAM | 466 | 2.7305 |
| 8 | 64QAM | 567 | 3.3223 |
| 9 | 64QAM | 666 | 3.9023 |
| 10 | 64QAM | 772 | 4.5234 |
| 11 | 64QAM | 873 | 5.1152. |

5. A User Equipment (UE) for transmitting channel state information, comprising:
   a receiver configured to receive a reference signal for measuring channel quality from a base station;
   a controller configured to measure the channel quality based on the reference signal, and select a channel quality indicator (CQI) index value from a predetermined CQI index table including CQI index values for 256 quadrature amplitude modulation (QAM) modulation, based on the measurement result of the channel quality; and a transmitter configured to transmit channel state information including the selected CQI index value to the base station, wherein:

the CQI index table includes three CQI index values for QPSK modulation, three CQI index values for 16QAM modulation, five CQI index values for 64QAM modulation, and four CQI index values for 256QAM modulation;

one of the four CQI index values for 256QAM modulation is configured to have one code rate value that supports a same transmission efficiency as a maximum transmission efficiency of a CQI index table that excludes CQI index values for 256QAM modulation; and another of the four CQI index values for 256QAM modulation is configured to have another code rate value same as the code rate value having a maximum transmission efficiency of a CQI index table that excludes CQI index values for 256QAM modulation; and wherein:

wherein:

the one code rate value of the one of the four CQI index values for 256QAM modulation is calculated to be 711 using "code rate×1024,"

the another code rate value of the another of the four CQI index values for 256QAM modulation is calculated to be 948 using "code rate×1024," and a different another code rate value of a different another of the four CQI index values for 256QAM modulation is calculated to be 797 using "code rate×1024."

6. The User Equipment of claim 5, wherein and five CQI index values for 64QAM modulation, respectively, to have a same difference within a predetermined error rate, as shown in a table below

| CQI index | modulation | code rate × 1024 | efficiency |
|---|---|---|---|
| 0 | | out of range | |
| 1 | QPSK | 78 | 0.1523 |
| 2 | QPSK | 193 | 0.3770 |
| 3 | QPSK | 449 | 0.8770 |
| 4 | 16QAM | 378 | 1.4766 |
| 5 | 16QAM | 490 | 1.9141 |
| 6 | 16QAM | 616 | 2.4063 |
| 7 | 64QAM | 466 | 2.7305 |
| 8 | 64QAM | 567 | 3.3223 |
| 9 | 64QAM | 666 | 3.9023 |
| 10 | 64QAM | 772 | 4.5234 |
| 11 | 64QAM | 873 | 5.1152. |

* * * * *

UNITED STATES PATENT AND TRADEMARK OFFICE
CERTIFICATE OF CORRECTION

PATENT NO. : 10,009,161 B2
APPLICATION NO. : 15/454020
DATED : June 26, 2018
INVENTOR(S) : Seung Hyun Kang et al.

Page 1 of 1

It is certified that error appears in the above-identified patent and that said Letters Patent is hereby corrected as shown below:

In the Claims

In Claim 4, Column 20, Line 38, "The method of claim 2," should be amended to --The method of claim 3,--.

Signed and Sealed this
Twenty-third Day of October, 2018

Andrei Iancu
*Director of the United States Patent and Trademark Office*